(12) United States Patent
Noddings et al.

(10) Patent No.: US 7,413,688 B2
(45) Date of Patent: Aug. 19, 2008

(54) FABRICATION OF OPTICAL DEVICES AND ASSEMBLIES

(76) Inventors: Kenneth Noddings, 102 Riley Rd., Austin, TX (US) 78746; Daniel Marshall Andrews, 8108 Flashpan Cove, Austin, TX (US) 78729; Michael Anthony Olla, 10709 Yucca Dr., Austin, TX (US) 78759-6949; Thomas Alan Bishop, 7000 Vallecito, Austin, TX (US) 78759

( * ) Notice: Subject to any disclaimer, the term of this patent is extended or adjusted under 35 U.S.C. 154(b) by 828 days.

(21) Appl. No.: 09/954,717

(22) Filed: Sep. 17, 2001

(65) Prior Publication Data

US 2003/0053770 A1 Mar. 20, 2003

(51) Int. Cl.
B29D 11/00 (2006.01)
G02B 6/26 (2006.01)
G02B 6/42 (2006.01)

(52) U.S. Cl. .................. 264/1.25; 264/1.26; 264/261
(58) Field of Classification Search ....... 264/1.24–1.26, 264/261

See application file for complete search history.

(56) References Cited

U.S. PATENT DOCUMENTS

| | | | | |
|---|---|---|---|---|
| 4,173,389 A * | 11/1979 | Curtis | ........................ | 385/92 |
| 4,466,697 A * | 8/1984 | Daniel | ....................... | 385/123 |
| 4,662,962 A * | 5/1987 | Malavieille | ................. | 156/158 |
| 5,013,495 A * | 5/1991 | Noba et al. | ................. | 264/1.25 |
| 5,026,411 A * | 6/1991 | Coyle et al. | .................. | 65/392 |
| 5,031,984 A * | 7/1991 | Eide et al. | ...................... | 385/27 |
| 5,308,555 A * | 5/1994 | Blyler et al. | ................ | 264/1.25 |
| 5,311,604 A * | 5/1994 | Rogner et al. | ................. | 385/14 |
| 5,376,506 A * | 12/1994 | Ehrfeld et al. | ............. | 430/321 |
| 5,389,312 A * | 2/1995 | Lebby et al. | ............... | 264/1.24 |
| 5,475,775 A * | 12/1995 | Kragl et al. | .................. | 438/25 |
| 5,574,814 A | 11/1996 | Noddings | .................... | 385/90 |
| 5,898,810 A * | 4/1999 | Devens et al. | ............... | 385/123 |
| 6,208,791 B1 * | 3/2001 | Bischel et al. | .............. | 385/129 |
| 6,222,967 B1 | 4/2001 | Amano et al. | ................. | 385/49 |
| 6,227,724 B1 | 5/2001 | Verdiell | ........................ | 385/91 |
| 6,233,383 B1 | 5/2001 | Artigue et al. | ................ | 385/39 |
| 6,234,687 B1 | 5/2001 | Hall et al. | ...................... | 385/88 |
| 6,500,603 B1 * | 12/2002 | Shioda | ........................ | 430/321 |

* cited by examiner

Primary Examiner—Philip C Tucker
Assistant Examiner—Sing P Chan
(74) Attorney, Agent, or Firm—Scheinberg & Griner, LLP; Michael O. Scheinberg

(57) ABSTRACT

A method of forming a waveguide or an optical assembly includes molding a waveguide material, optionally in alignment with one or more optical components. The one or more optical components are aligned in a precision mold that is also used to form the waveguide. A cladding and encapsulation material can also be molded. The molded materials can be used to hold the components together in alignment in a single assembly. A connector structure can be molded as part of the assembly or can be prefabricated and incorporated into the molded assembly to facilitate connecting the assembly to other components without requiring active alignment or polishing of optical fiber ends.

24 Claims, 10 Drawing Sheets

FABRICATION OF OPTICAL DEVICES AND ASSEMBLIES

TECHNICAL FIELD OF THE INVENTION

The present invention relates to the fabrication of optical devices and assemblies.

BACKGROUND OF THE INVENTION

Optical devices are widely used in communications applications because optical fibers can carry significantly more information than conventional copper wires can carry in the same space. Optical devices are also being used to connect computer components such as circuit boards and even individual circuits because of their great capacity and relative immunity to interference.

The small size of optical components, while allowing a great many components to be assembled in a small volume, makes the components difficult to assemble and connect to each other. Optical fibers, for example, are typically only a few thousandths of an inch in diameter. They are composed of a core, a cladding, and a coating. The cladding has an index of refraction slightly less than that of the core, and the coating has an index of refraction that is slightly greater than that of the cladding. The core, cladding, and coating are typically made of silica glass. Light propagates in the core and is reflected off the cladding, thereby guiding the light within the core. The coating protects the fiber from the environment and provides mechanical strength to reduce unacceptably tight bending of the fiber.

Light can propagate in an optical fiber in any number of vibrational modes. Fibers that support a single mode are called "single mode fibers" and fibers that support multiple modes are called "multi-mode fibers." The width of a typical single-mode optical fiber core is about 9 microns (0.0004 in.). The cladding diameter is typically about 125 microns (0.005 in). The diameter of a multi-mode fiber core is typically about 50 μm (0.002 in) and the diameter of the cladding is typically about 125 microns (0.005 in). The index of refraction of the core of some multimode fibers, known as graded index fibers, changes gradually as the distance from the axis increases.

Because of the small diameter of the optical fibers, it is difficult and expensive to accurately align the fibers with each other and with other components. For example, when two optical fibers are coupled, the axes of the fibers need to be aligned within a few microns so that the light exiting the core of one fiber enters the core of the next fiber. A misalignment between the cores of a single micron will result in greater than a ten percent loss of light. Because only light that enters the fiber within an "acceptance angle" will propagate down the fiber, the angles between the fibers that are coupled must be close to zero. Similarly, light exits the fiber in the shape of a cone. Connecting fibers must be positioned as close to each other as possible so that most of the cone of line light exiting one fiber is within the core of the next fiber.

Moreover, to reduce loss of light as it leaves an optical fiber, the optical fiber must be properly "terminated" before connecting to other fibers or other components. The optical fibers must be cut at a precise angle and its end polished. The process of preparing the fiber end, or terminating the fiber and aligning it is time consuming and therefore expensive.

Different optical components perform different functions with regard to light signals so it is necessary to route light using optical fibers and waveguides to different components to perform different operations. For example, light may be generated by a laser, routed through an optical fiber, switched to an alternate fiber, multiplexed into a fiber with light of a different wavelength, separated out for the different wavelengths, and then detected by a detector. Typically, light is routed between components by optical fibers or other waveguides.

Optical components can be classified as either active or passive. Passive devices include, for example, optical fibers that carry light and couplers that route light between fibers. Active devices include, for example, light emitting diodes and lasers that generate light and detectors that detect light and convert the light signal into an electrical signal. One type of laser that has become widely used in optoelectronics is the vertical cavity surface emitting laser, or VCSEL. A VCSEL is typically fabricated on a semiconductor die or chip and emits light perpendicular to the surface of the chip.

Optical components, including optical fibers, are frequency grouped to process multiple signals in parallel. Such groups include arrays of lasers or photodiode detectors and cables containing multiple optical fibers. Optical components perform functions such as detection, optical signal branching, optical multiplexing, optical switching, and optical modulation.

Optical components such as laser and photodetectors are typically assembled into packages. Aligning the components within the package and aligning the fiber with the package are time consuming, expensive operations. Moreover, the optical fibers that are routed to the packages must be aligned with the components in the package.

The cost of aligning and connecting the components within the package is one of the major costs of producing the optical packages and of using the optical package. When connecting optical fibers, it is typically necessary to "actively align" the fibers to the devices, that is, light is transmitted though the device and the connection is monitored during the alignment process. For example, when aligning optical fibers to a laser, the laser will be operating and a detector is connected to the opposite end of the fibers. The fiber is adjusted in relation to the laser until the light detected at the other end of the fiber is maximized. Once alignment is obtained, the position of the components relative to each other is fixed, typically by an ultraviolet curable adhesive or solder, and the assembly is typically either hermetically sealed or surrounded with a plastic material. The fiber is typically metal coated and soldered to seal with the package and to fix it in place.

To complicate the alignment problem, many components require electrical connections, as well as optical fiber connections. For example, lasers need an electrical power supply and information signals are provided to modulate the laser beam. As another example, photodetectors provide electrical signals that correspond to the intensity of the received light. Electrical signals are conducted to and from components by fine wires that are bonded to conductive pads on the components. The resulting assembly is fragile and is often sealed to protect it from the environment.

Many connection schemes have been proposed to facilitate the connection between different types of optical components. For example, "V"-shaped grooves etched into a component package can be used to align optical fibers with the component. Many of the mechanical connectors that align optical components are etched from silicon or machined from ceramic to meet the tight tolerances.

U.S. Pat. No. 6,222,967 to Adano et al. for "Packaging Platform, Optical Module Using The Platform, and Methods for Producing the Platform and Module" describes a system that uses a package having grooves to position optical fibers and having horizontal and vertical reference surfaces to position components in three dimensions in relation to the fibers.

The fiber and components are fixed in position by a cover plate or by an adhesive. U.S. Pat. No. 6,233,383 to Artigue et al. describes another system using reference surfaces for aligning optical components.

U.S. Pat. No. 6,227,724 describes a method for constructing an electro-optical assembly that uses a flexure element that can be deformed to bring an optical component into alignment with other components on a substrate. The flexure element is then fixed to the substrate.

U.S. Pat. No 5,574,814 to Noddings et al. describes a method of assembling an optical transceiver with an optical connection. A laser is used to precision drill slots for the connector tooling pins in the connector body, so that the fibers in the connectors align accurately with the transceiver. This technique enables a passive assembly technique as opposed to active alignment using optical power coupling to align the device.

SUMMARY OF THE INVENTION

An object of the invention is to provide a method and apparatus for assembling and packaging optical devices.

The present invention comprises a method of assembling optical devices, the assemblies so produced, and the tools used to produce the assemblies. In accordance with the invention, at least one optical component is aligned in a precision mold. A waveguide is then formed to carry light to or from the component. A cladding material and an encapsulating material are optionally formed as part of the assembly. The assembly can be held together by the molded material or a structural element can be included as part of the molded assembly.

A wide variety of assemblies can be produced using the present invention. For example, the invention could be used to terminate optical fibers with molded components, e.g., waveguides, gratings, filters, and splices, that can be readily interfaced with other assemblies. The invention could also be used to create complex assemblies including optical, electrical, and mechanical components, including lasers, integrated circuits, and microelectromechanical (MEMS) devices.

The assembly is preferably made using a low pressure, low temperature process to reduce distortions of the mold, thereby providing accurate alignment of components.

In some embodiments, the invention can eliminate the need for polishing the fiber interfaces or optical components. In some embodiments, the invention can eliminate the needs for active alignment of fibers, lasers, or waveguide components, separate component and fiber bonding, and package sealing steps. In some embodiments, the invention can form the final enclosure as part of the molding process, thereby eliminating the need for a separate and expensive package.

The foregoing has outlined rather broadly the features and technical advantages of the present invention in order that the detailed description of the invention that follows may be better understood. The invention has broad applicability and embodiments can be tailored to specific applications. Not every implementation will include every feature or provide every benefit of the invention. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
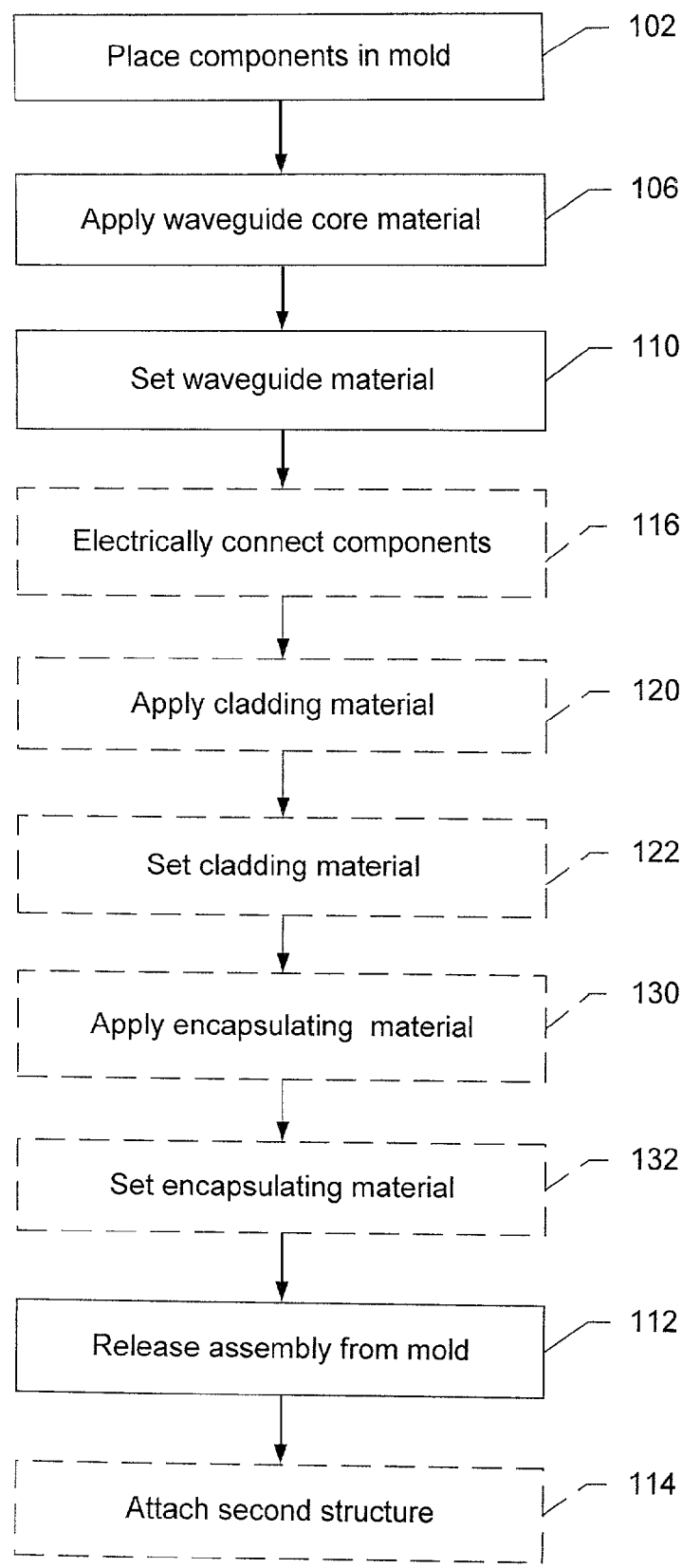
FIG. 1 is a flow chart showing the preferred steps for making an optical assembly in accordance with the present invention.

The invention comprises a method and apparatus for assembling optical components. FIG. 1 shows the steps of a preferred embodiment of the invention. In step 102, the components of the assembly are placed in a precision mold. The mold has reference structures to precisely position the optical components in relation to each other, typically in three dimensions.

The term "mold" is used herein in a general sense to describe any process that forms a structure by providing a shape to a formable material, such as a liquid or a plastically deformable solid. The term "mold" is also used to refer to the tool that imparts the shape to molded material. Molding processes that can be used in the invention include, by way of example and not of limitation, compression molding, transfer molding, injection molding, reaction injection molding, stenciling, extruding, screen printing, roll to roll processing, and embossing. In some embodiments, the mold may comprise a plate having indentations into which molding material is forced using a blade in a manner similar to a silkscreen process, but optionally without a screen.

The components can be aligned in the mold using a variety of methods. For example, the components and the mold can have reference surfaces such that when the reference surfaces on a component are placed in contact with the reference surfaces on the mold, the components will be aligned in two or three dimensions. The components can also include bumps, pins, precision laser-drilled or micro-machined holes or other structures that align with complementary structures in the mold.

Embodiments of the invention can comprise a molded waveguide alone or an assembly of multiple waveguides and other components. An assembly formed in accordance with the invention can include any type of component, such as optical components, electrical components, and or mechanical components. For example, optical components may include passive optical components such as individual optical fibers, arrays of optical fibers, lens elements, gratings, filters, waveguides, and holograms. Fibers used with the invention can be either bare or contained in ferrules. Optical components could also include active components, such as, lasers, detectors, emitters, transceivers, switches, and amplifiers. The assembly can also include electrical devices such as integrated circuits and mechanical devices, such as MEMS (micro-electromechanical) devices.

The assembly can also include structural components. Structural components can be prefabricated and then joined with other components during the molding process or the structural components can be formed during the assembly molding process. For example, the assembly can be formed on a rigid or flexible printed circuit board that supports the other elements. Other structural components could include, for example, structures of ceramic, semiconductor substrates, such as substrates of silicon or gallium arsenide, and polymers. Structural components molded into the assembly can be formed, for example, from polymers or composite materials, such as ceramic or metal particles in a matrix of polymers.

A waveguide material, typically a polymer, is then applied in step 106, the mold defining the shape in which the waveguide is formed. The mold is thus used to position and align the components in two or three dimensions and to define the shape of the waveguide.

The material from which the waveguide is formed preferably has an index of refraction matched to the fiber core or other mating component and has low absorption to light in the wavelengths to be used with the finished optical assembly. The material preferably has a molding temperature of under 150° C., good adhesion to glass and other optical components in the assembly, low molding viscosity, and stability to temperatures greater than 180° C. after molding and any post-molding cure. Some useful materials, for example, have a viscosity of about 175 centipoises at room temperature. The viscosity is preferably less than 1000 centipoises. The material also preferably exhibits pre-molding stability and fast cure or solidification in the mold. Either thermosetting or thermoforming plastics can be used, with thermosetting materials generally being preferable because of their better stability of the product at higher temperatures. The operational hardness and flexibility depend on the application. In some instances a flexible low modulus material is desirable in order that the material imparts minimal strain on the aligned assembly. Other assemblies may require the opposite, a hard high modulus material to provide rigid structural support.

Base on the guidance above and the examples provided below, skilled persons will be able to select a formable waveguide material to be used for different applications.

For example, one preferred waveguide material is known by the trade name of TOPCAT and consists of amorphous cyclic polyolefin waveguide polymers developed by B. F. Goodrich Electronic Material Division, now part of Sumitomo Bakelite Co., Ltd., and managed by Erie Research, LLC, Brecksville, Ohio or another material of the same class sold under the name "Topas" by the Ticona division in Summit, N.J., of Celanese A. G., Kronberg im Taunus, Fed Rep Germany. Other suitable materials include polymeric materials such as OPTOCAST 3400 series from Electronic Materials Inc., Breckenridge, Colo., acrylic materials, such as NOA number series, from Norland Products, Inc.Cranbury, N.J. and silicone materials OCK-433 or OCK-451 from Nye Lubricants, Inc., Fairhaven, Mass. S Ultraviolet (UV) curable materials, such as acrylic material NOA 71, from Norland Norland Products, Inc.Cranbury, N.J. and/or OPTOCAST 3500 series from Electronic Materials Inc., Breckenridge, Colo. are also suitable for use as a waveguide material. UV curable material would be suitable used when the waveguide material is applied using a technique, such as screening, stenciling, or compression molding, in which the molded material is exposed in the mold and can be irradiated with ultraviolet light. UV curable materials can also be used with a mold formed of a material, such as glass, that is transparent to UV light.

After the waveguide material is applied, it is then cured or set in step 110. Depending on the material used for forming the waveguide, the setting process may involve heating the mold or exposing the molded material to ultraviolet light. Some materials set rapidly without requiring an external source of heat. After the waveguide material is set, the molded assembly is released from the mold in step 112. The mold may be cooled to facilitate release of the assembly. In addition mold release compounds may be applied to the mold or specialized coatings such as teflon can be permanently applied to also facilitate release. When the lift-off structure is contacted to the molded assembly or component, the assembly or component sticks to the material and is removed from the mold as the lift-off In some embodiments, the assembly or component is released from the mold using a "lift-off" process in which the assembly or component is stuck to a support or "lift-off" structure and is lifted from the mold when the lift-off structure is raised. For example, the lift-off structure may be a rigid structure having an adhesive surface. The lift-off structure can be molded directed onto the assembly or component in its cavity plate, for example, by using a screening process or a compression or injection molding process. The lift-off structure can be molded from cladding material in the same molding operation in which the cladding is applied to the waveguide core. The lift-off structure could be, for example, formed or inserted in a top plate and then the top plate can be pressed into contact with the molded assembly before one or both of the assembly or the lift-off structure is fully cured. The uncured or partially cured molded lift-off structure will adhere to the molded assembly or component. The lift-off structure can be in the form of a portion of a connector, so that the complete assembly can be readily interconnected to another component.

In optional step 114, a second structure is adhered to or molded to the lift-off structure, to further surround and protect the assembly. The lift-off structure and the second structure may combine to form a standard connector shape. The lift-off structure can also be bonded directly to the core material during the molding process or it can be made from molded and cured waveguide cladding material and become the waveguide cladding.

Several steps can optionally be performed before the assembly is removed from the mold in step 112. Step 116 shows that electrical connection terminations are optionally provided to any of the components positioned in step 102 that require electrical connections to supply, for example, information or power. Although step 116 is shown after curing of the waveguide material, step 116 can be performed any time in the process before the assembly is encapsulated. Components in the assembly can be electrically connected to each other, for example, by wire bonding or solder reflow.

Optionally, a cladding material is molded over the waveguide material in step 120. The choice of cladding forming material will typically depend on the material used as the waveguide forming material. The cladding forming material preferable adheres to the waveguide forming material and has an index of refraction less than that of the waveguide forming material. The cladding material preferably has molding, curing, and thermal performance properties similar to those described above with respect to the waveguide forming material. The same materials discussed above as waveguide forming materials are suitable as cladding forming material as long as the index of refraction is less than that of the waveguide forming material being used. When cladding material is applied in step 120, a lift-off structure as described above with respect to step 112 can be formed of cladding material. Based on the guidance and examples provided above, skilled persons will be able to select an appropriate cladding forming material for any particular implementation.

The cladding material is set in step 122. If no cladding material is used or if the cladding does not completely surround the waveguide core material, the ambient air provides the change of index of refraction necessary at the waveguide material boundary. The molded cladding material can also be used as a structural component to hold the assembled optical components together in alignment and to provide any structural members necessary for insertion in an optical circuit or to connect to another finished component or fiber. A third material can also be applied to hold the assembly together, or as described above, the assembly can be formed on a structure component. An optional encapsulating material, such as an epoxy resin, can be molded in step 130 over the assembly to protect the assembly from the environment and be cured or set in step 132. The encapsulating material can be used as a lift-off structure to facilitate removing the molded assembly from the mold.

The high temperatures and pressures of many molding processes tend to distort the molds, making many molding processes unsuitable for optical connections that require tight tolerances. A low temperature molding process that reduces thermal expansion of the mold, thereby allowing for accurate molding and positioning of parts is preferred. A preferred molding process uses a molding temperature of less than about 140° C., with a more preferred temperature of less than 120° C. or 100° C., and a most preferred process using temperature under 70° C. The optimum molding temperature for any particular application will depend upon the material used to form the molded component. The waveguide and cladding materials are chosen so that they can be formed at relatively low temperatures and low pressures.

In some molding processes, the material being molded is forced into a cavity defined by the inner mold surfaces and sometimes defined in part by a component being molded into the assembly. The molding material is typically inserted under pressure to ensure that it completely fills the cavity. The mold must seal tightly against the components that form part of the walls of the mold cavity. In some embodiments, to prevent the molding material from being forced outside of the cavity, the mold is tightly clamped. Clamping pressure is typically from five to ten times the injection pressure. Tightly clamping the parts, however, tends to distort them, thereby preventing the molded assembly from achieving the very fine tolerances required. High injection pressure also requires a more expensive and massive die and can result in more thermal variation within the molded assembly, which makes maintaining the very fine tolerances required difficult or impossible.

The molding materials for the waveguide and cladding preferably can be formed under relatively low pressure or even no pressure at all, thereby eliminating the necessity for high clamping pressures and allowing applicants to achieve the tolerances required for optical assemblies. For example, the waveguide or cladding material can be applied through a stencil or a screen using a blade to force the material into the mold as the blade crosses the mold surface. In some embodiments, a vacuum is applied to assist the material being molded in filing the mold cavities without trapping air.

The molds preferably have precision machined, embossed, or cast surfaces that are used to position the assembled parts preferable within 5 μm, more preferably within 3 μm and most preferably within 1 μm. The relative positions of the mold surfaces are preferably accurate within +/−1 μm. Such high precision molds can be produced, for example, using a diamond point turning fly cutting process or by a highly skilled tool and die maker using conventional machining methods or by using photolithographically defined etching or electroplating.

To maintain the required tolerances, critical portions of the mold, such as the cavity plates, are preferably fabricated from a single block of material, such as any one of a number of mold quality tool steels, for example, D2, H-13, A-6, ASP-30, ASP-60, S-7 or M2 tool steels. The mold could also be fabricated from aluminum plated with nickel or hard chrome, nickel or chrome plated kovar. Because of the low temperatures and pressures typically used with the present invention, it is also possible to fabricate the mold using other materials, including Teflon, plastic, and etched silicon. The mold material preferably has a thermal coefficient of expansion similar to that of the components being molded, so that there is little relative motion with temperature change.

Because the malleable molded material contacts the mold, the surface texture of the die is transferred to the molded material. The mold can therefore be used to form a desired surface finish on the molded material. In connecting optical fibers, it is typically necessary to cut the fiber or waveguide at a precise angle and to polish the end to achieve a smooth surface that reduces scattering of light. The invention allows a desired angle and surface finish to be molded directly into a waveguide. To impart a sufficiently smooth surface to the waveguide, the surface roughness of the mold is preferably less than one quarter of the wavelength of the light to be used in the waveguide. Also by using a material having a refractive index matched to that of the fiber, the mold material will encapsulate the rough "as cleaved" fiber surfaces, thereby smoothing these surfaces and negating the need to polish the fiber. In some embodiments of the invention, light scattering from the terminated fiber or waveguide can be tolerated, so a smooth surface on the mold is not always required.

Figure 2:
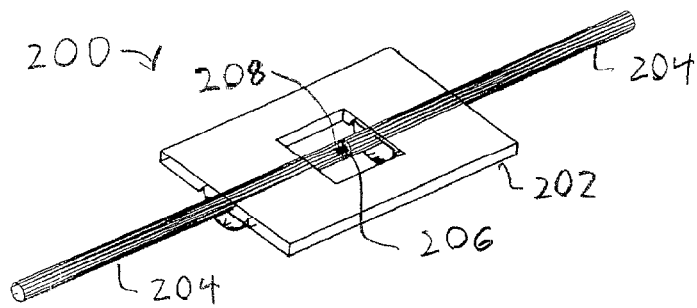
FIG. 2 is a pictorial view of a molded fiber-to-fiber connection or splice in accordance with one embodiment of the invention.
Figure 3:
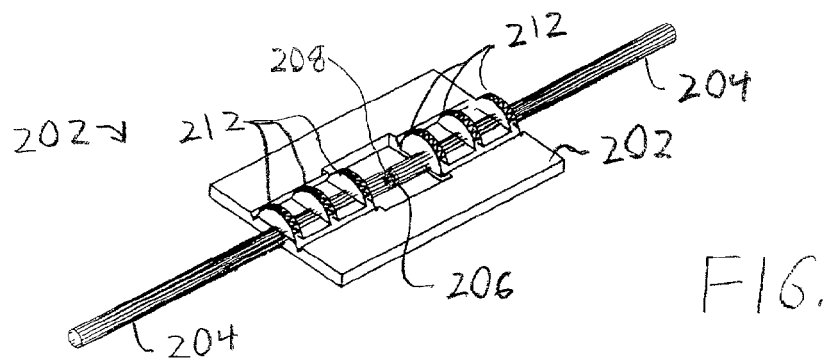
FIG. 3 is another pictorial view of the molded fiber-to-fiber connection of FIG. 2.

FIGS. 2 and 3 show two different views of a molded waveguide assembly 200 made in accordance with a first embodiment of the invention. Molded waveguide assembly 200 connects two optical fibers 204. Molded waveguide assembly 200 includes a stiffener plate 202, reinforcement structures 212 for providing mechanical strength to stiffener plate 202, and a molded waveguide core 206 for guiding the light between fibers 204. Molded waveguide assembly 200 also preferably includes a cladding 208 surrounding a portion of molded waveguide core 206. The cladding material improves the light carrying capability of molded waveguide core 206.

Figure 4:
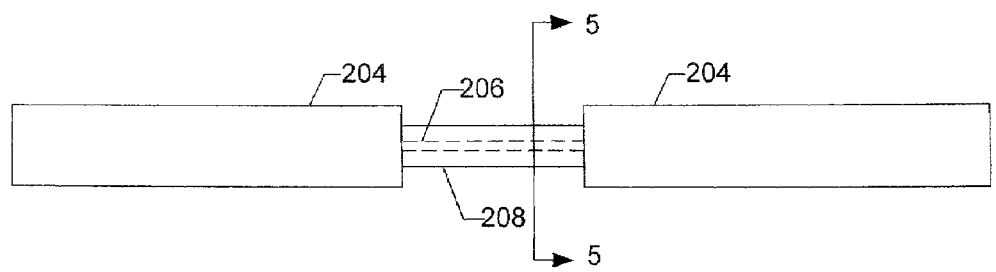
FIG. 4 is detail view of a part of the fiber-to-fiber connection of FIG. 2
Figure 5A:
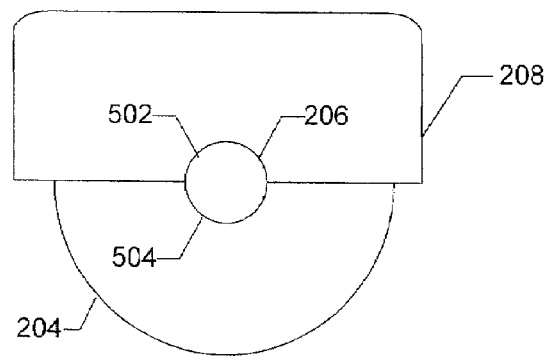
FIG. 5A is a sectional view taken along the line 5-5 of the fiber-to-fiber connection of FIG. 4.

FIG. 4 shows enlarged a portion of waveguide assembly 200 of FIGS. 2 and 3. The waveguide core 206 is shown as a broken line to indicate that it is under cladding 208, although both materials are transparent. FIG. 5A is a cross section taken along the lines 5-5 of FIG. 4. FIG. 5A shows that cladding 208 is formed as a "ridge cladding," that is, it covers only an upper half 502 of core 206. The lower portion 504 of waveguide core 206 uses air as its cladding material. Although air is not as effective as cladding material 208, air provides adequate cladding for the short length of waveguide core 206. The reason for the use of a ridge cladding in this embodiment will become clear when the manufacturing process is described below. If different manufacturing techniques are used, the cladding material can be molded completely around core 206.

Figure 5B:
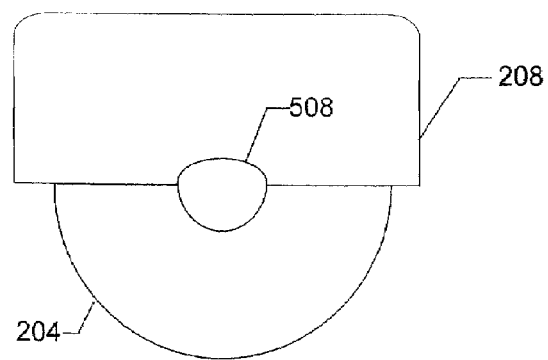
FIG. 5B is a sectional view of an alternative embodiment of the fiber-to-fiber connection of FIG. 4.

In the example shown in FIG. 5A, waveguide core 206 is formed in an injection or compression mold using an upper cavity plate and a lower cavity plate. Waveguide core can then be shaped on the top and the bottom and so is round. A waveguide can also be formed using a lower cavity only and a screening or stenciling process. The rounding of the upper surface in such cases will be shaped not by a mold but by gravity and surface tension. As shown in FIG. 5B, the upper half of a waveguide 508 formed by such a process may not be perfectly round. Cladding 208 is stenciled or screened over waveguide core 206. Cladding 208 could also be formed in an injection or compression mold.

Figure 6:
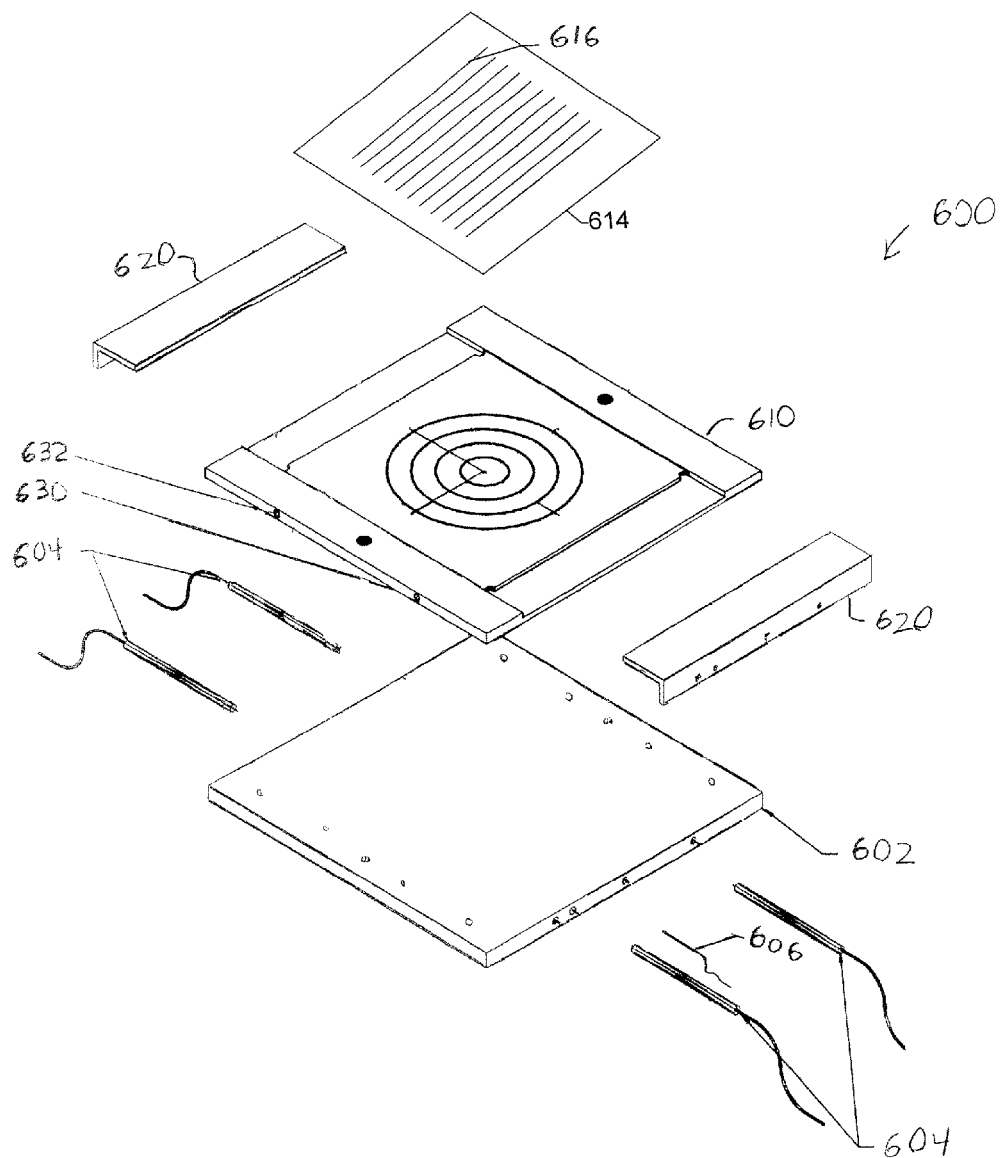
FIG. 6 is an exploded view of the mold used to produce the fiber-to-fiber connection of FIGS. 2 and 3.
Figure 7:
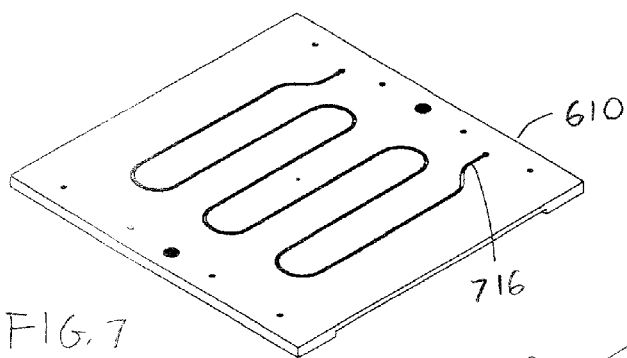
FIG. 7 shows the underside of the alignment plate of FIG. 6.
Figure 8:
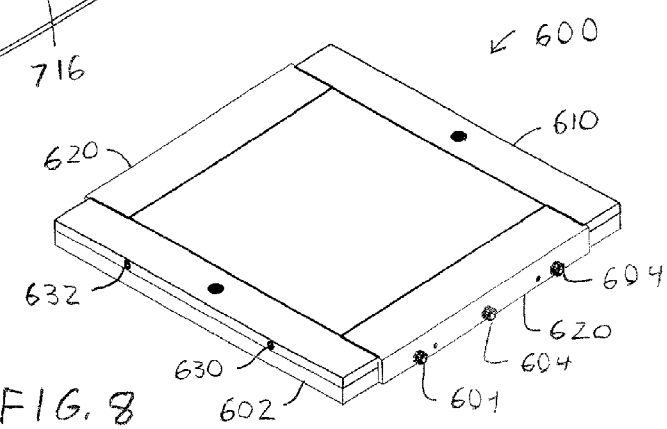
FIG. 8 shows the mold of FIG. 6 assembled.

FIG. 6 shows an exploded view of preferred mold 600 used to manufacture molded waveguide assembly 202. Mold 600 includes a base plate 602 having cavities therein for receiving cartridge heaters 604 and a thermocouple 606. Positioned above base plate 602 is an alignment plate 610, which is secured to the base plate and is used to align a cavity plate 614. Cavity plate 614 includes cavities 616 into which the material being molded is inserted, the material taking the shape of the cavities and hardening in that shape. Thus, a different cavity plate will be used for molding different assemblies. Another plate (not shown) or other apparatus applies pressure to the molding material to force it into cavities 616. Alignment plate 610 is held to base plate 602 by clamp brackets 620, which are secured by screws into opposite sides of base plate 602. FIG. 7 shows the backside of alignment plate 610, which include cooling channels 716 for cooling the mold 600 to assist in releasing the molded assembly. FIG. 6 shows an inlet 630 and an outlet 632 for a cooling fluid. FIG. 8 shows the mold of FIG. 6 assembled, but without cavity plate 614.

Figure 9:
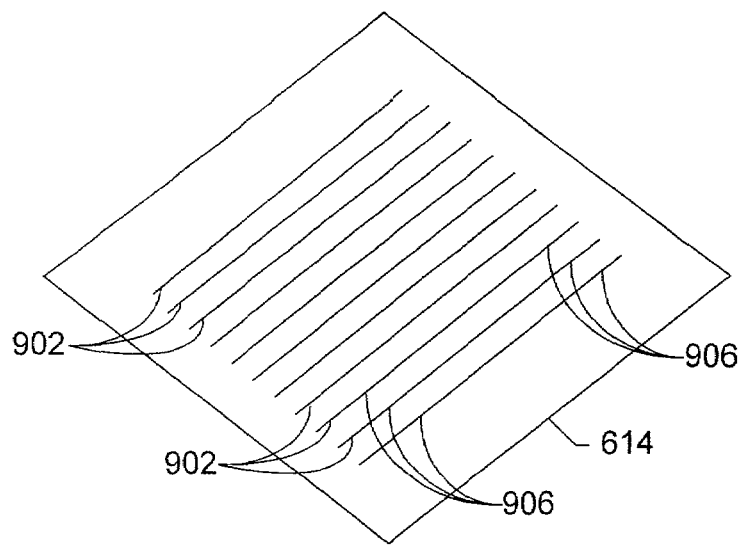
FIG. 9 shows a cavity plate used with the mold of FIG. 6.
Figure 10:
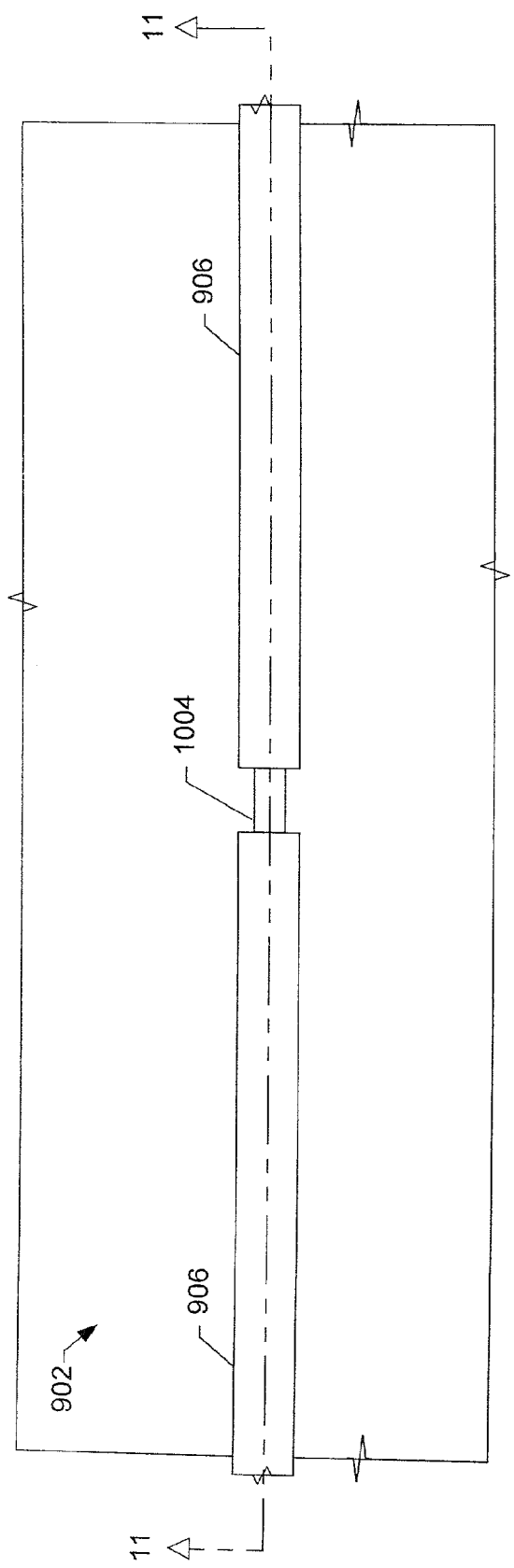
FIG. 10 shows an enlarged view of a portion of the cavity plate of FIG. 9.
Figure 11:
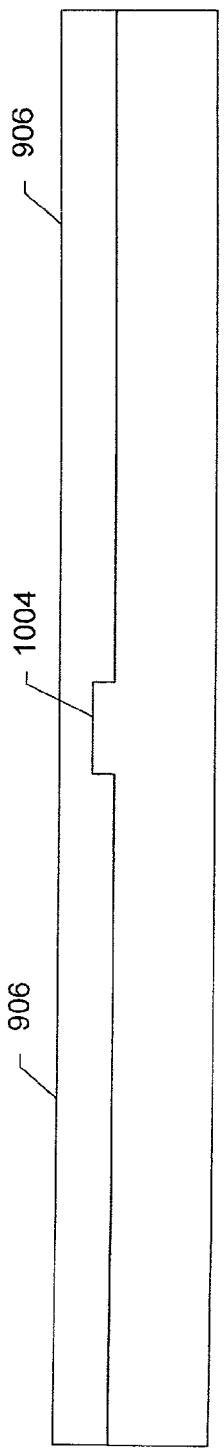
FIG. 11 shows a cross section taken along the lines 11-11 of the cavity plate of FIG. 10.

FIG. 9 shows cavity plate 614 having multiple forms 902, each form 902 being used to create a molded waveguide assembly 202. FIG. 10 shows an enlarged view of a single form 902. FIG. 11 shows portion of a cross section of a form 902 taken through the lines 11-11 of FIG. 9. Each form 902 includes two grooves 906 for accepting optical fibers 204. The grooves are precisely formed to accurately align the optical fibers. Form 902 also includes a shallower groove 1004 between grooves 906. Material inserted into groove 906 during the fabrication process will form the waveguide 202 between optical fibers 204.

Figure 12:
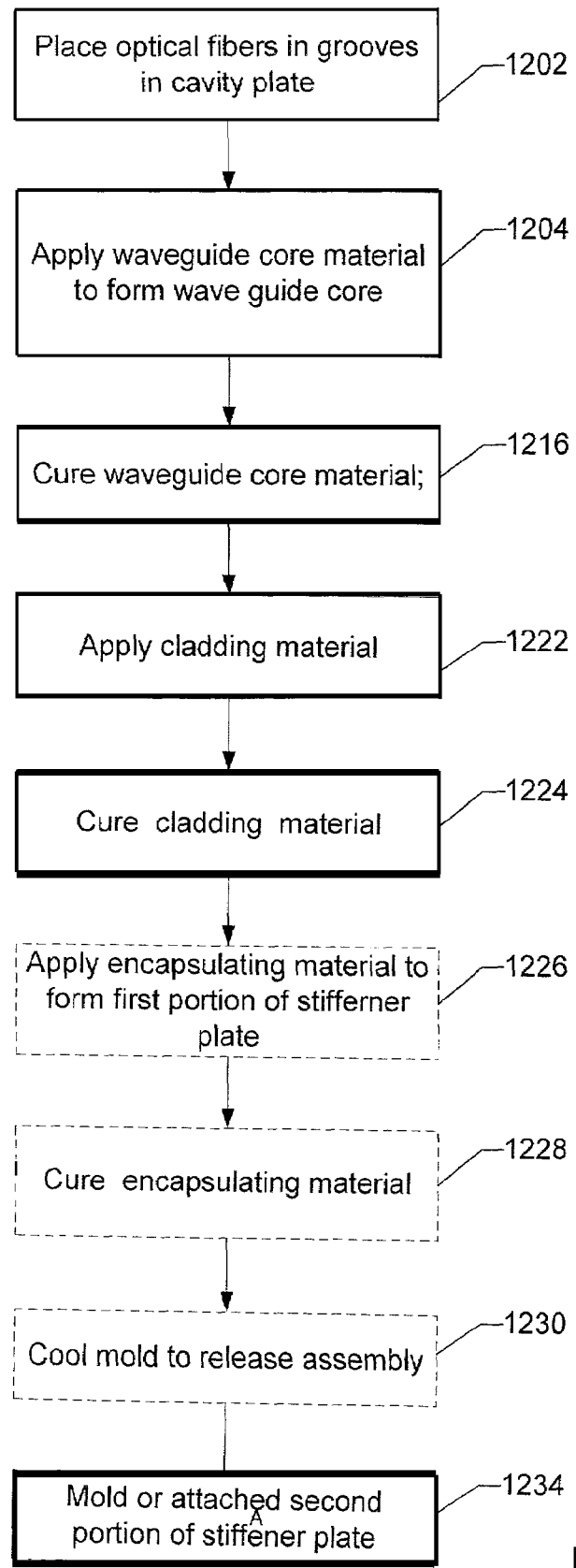
FIG. 12 is a flow chart showing the steps of a preferred method of producing the fiber-to-fiber connection of FIGS. 2 and 3.

FIG. 12 is a flow chart showing the steps of a preferred method for fabricating the molded waveguide assembly 202 of FIGS. 2 and 3. Step 1202 shows that optical fibers 204 are placed in cavity plate 614 of mold 600. Step 1204 shows that a waveguide core material is applied, for example, by a molding technique such as compression molding, injection molding, screening or stenciling to form waveguide core 206. In accordance with an injection or transfer molding technique, a top plate having a depression corresponding to waveguide 202 is secured over the cavity plate 614.

Figure 13:
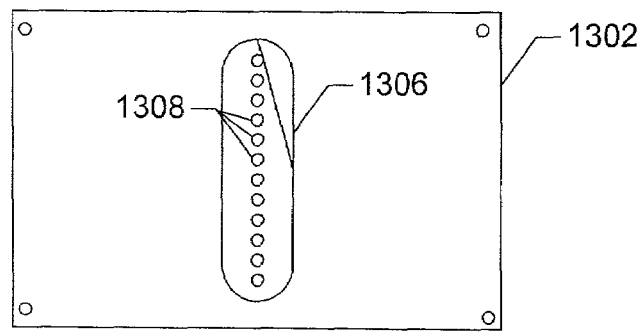
FIG. 13 shows an upper cavity plate that can be used in the mold of FIG. 6 to form the fiber-to-fiber connection of FIGS. 2 and 3 utilizing a transfer or injection molding process.

FIG. 13 shows a top cavity plate 1302 having on one major surface a groove 1306 with multiple holes 1308 extending through top cavity plate 1302. The second major surface (not shown) of top cavity plate 1302 includes grooves, complementary to grooves 906 and 1004 (FIG. 10) in cavity plate 614 for accommodating optic fibers 204 and for forming the top surfaces of waveguide core 206. Each hole 1308 opens onto a form 902 in lower cavity plate 614.

Figure 14:
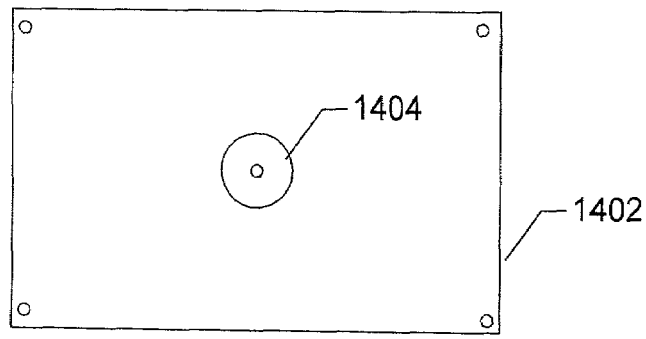
FIG. 14 shows an upper mold plate used with the upper cavity plate of FIG. 13.

FIG. 14 shows a top plate 1402 having a single, conical hole or "sprue" 1404. Top plate 1402 mounts above top cavity plate 1302 so that conical hole 1404 is positioned above groove 1306. Material is forced through hole 1404 to file groove 1306 and then through holes 1308 to fill forms 902. Cavity plate 614 or cavity plate 1302 includes passages (not shown) for air to escape as molding material is forced into forms 902. The passages may be connected to a pocket or "slugging" area to allow easier extraction of air. The passages or slugging area may be connected to a vacuum source to assist in filling the cavities without leaving trapped air, thereby reducing the amount of pressure required to force material into the mold. Reducing the pressure reduces the deformation, facilitating achieving the precise positioning required of optical components.

As the waveguide material is being forced into form 902, the material is heated to slightly above ambient temperature to reduce the pressure required to force material into form 902. For example, if TOPCAT is used as the waveguide material, it is preferable heated to between 60° C. and 70° C., preferably about 65° C., and applied using the very small pressure of between 10 psi and 100 psi, preferably about 20 psi.

After the waveguide core 206 is formed, the mold is heated in step 1216 to an appropriate temperature for curing. The preferred temperature and time required to cure the materials will vary with the material. The manufacturer of the material used as the waveguide will typically provide recommendations about the temperature and duration of the curing process. For example, if TOPCAT is used as the waveguide, it is cured at about 65° C. in the mold assembly for initial setting up and the cavity plate is removed from the mold assembly and the material is heated to about 150° C. for an hour to complete the curing or setting up of the material.

In step 1222, a cladding material 208 is molded onto waveguide material 206. The cladding material may be applied by a manner similar to the manner in which waveguide core material 206 was applied, using a top cavity plate having a groove concentric with, but having a larger radius than, the groove used to form the top of waveguide core 206. If the waveguide material is not removed from bottom cavity plate 614 before forming cladding 208, the cladding material is formed around only the top portion of waveguide material 206, forming a "ridge cladding," with the remaining portion of waveguide core 206 being "cladded" by air. If desired, the molded assembly can be removed from bottom cavity plate 614, turned over, and additional cladding material can be molded to waveguide material 206 to surround it entirely with cladding. Alternatively, cladding material can be applied without using a top cavity plate, for example, by screening or stenciling.

After the cladding material is applied, it is cured in step 1224. The manufacturer of the material used as the cladding material will typically provide recommendations about the temperature and duration of the curing process. For example, when using a TOPCAT material, the cladding is cured at about 65° C. in the mold assembly for initial setting up and the cavity plate is removed from the mold assembly and the heated to about 150° C. for an hour to complete the curing or setting up of the material. The TOPCAT cladding material can be applied to the core material after the cores 65° C. partial curing step and then heated to 65° C. to set in place. Then both materials can be heated to 150° C. to complete the curing process. If the cladding material is a screened, UV curable material, it is cured by exposure to ultraviolet light.

Note that optical fibers 204, which were precisely aligned by cavity plate 614, are partially embedding in the cladding material during the molding process and thereby permanently fixed in alignment without the necessity of an active alignment process.

The cladding material improves the transmission of light in the waveguide core 206. Because waveguide core 206 is very short, in some applications, the cladding material can be eliminated, with the surrounding air providing the cladding. The cladding material can also be used as a protective layer for the assembly or as a structural component.

In optional step 1226, an encapsulating material, such as an epoxy, can be applied over the entire assembly to further protect the assembly from environmental hazards. The encapsulating material can be applied using a screening, stenciling, or other process. After the encapsulation material is applied, it is cured in step 1228.

Because the waveguide material is molded into contact with the optical fibers and the index of refraction of the waveguide material matches that of the fiber core, there is no need to cut the fiber ends at any particular angle or to polish the ends of the optical fibers. Because the cavity plate maintains the optical fibers in precise alignment as they are being fixed in the molded assembly, there is no need for active alignment.

After the waveguide core 206 and optionally the cladding 208 is formed, the mold assembly 600 is optionally cooled in step 1230, and the assembly of waveguide core 206, fibers 204, and cladding 208 is removed. Because of the thinness of waveguide core 206, fibers 204, and cladding 208, it is typically necessary to supply additional mechanical support to remove the assembly. In one embodiment, a first part of stiffener plate 202 is molded over the top of the waveguide core 206, fibers 204, and cladding 208, possibly as encapsulation in step 1228. Waveguide core 206, fibers 204, and cladding 208 adhere to encapsulation material molded to form the first part of stiffener plate 202. When the first part of stiffener plate 202 is removed from the mold, waveguide core 206, fibers 204, and cladding 208 are removed also. Because fibers 204 and waveguide core 206 are positioned or formed in grooves in cavity plate 614, the material for forming the first part stiffener plate 202 cannot entirely surround waveguide core 206, fibers 204, and cladding 208. Stiffener plate 202, therefore, cannot be molded in a single step. After the waveguide core 206, fibers 204, and cladding 208 are removed from cavity plate 614, step 1234 shows that the rest of stiffener plate 202 can be molded onto the assembly or a pre-molded part can be attached, for example, by an adhesive to complete the formation of stiffener plate 202.

Alternatively, waveguide core 206, fibers 204, and cladding 208 can be removed in step 1228 by using a "lift off" process. A first part of a pre-molded stiffener plate 212 having an adhesive applied thereto is contacted with waveguide core 206, fibers 204, and cladding 208. Alternatively, the stiffener plate can be applied to a partially cured waveguide core, which then is cured during this contact, which provides adhesion. Waveguide core 206, fibers 204, and cladding 208 are then removed from the mold as the stiffener plate is lifted. In step 1234, a second portion of stiffener plate 202 is contacted to the adhesive to form assembly 200 that surrounds the fibers 204. The entire assembly 200, or the waveguide and cladding portion of assembly 200 can be encapsulated in a protective material.

Although stiffener plate 202 is shown as a flat plate with semicircular semi-cylindrical stiffening members 212, the stiffener plate 202 could be formed in any shape. For example, in some embodiments, a stiffener plate could be formed in the shape of a standard connector, such as an MT connector on the end termination point of one or more fibers, which will prepare the fibers to interface with the other mating half of a like connector.

Figure 15:
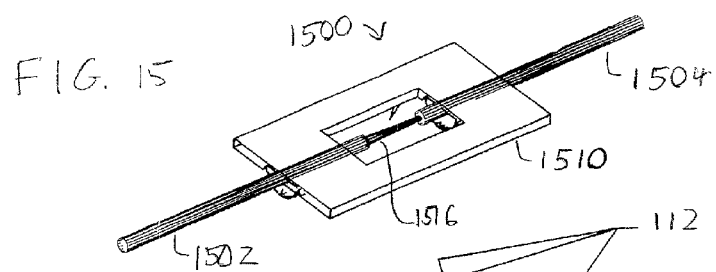
FIG. 15 is a pictorial view of a molded tapered fiber-to-fiber connection in accordance with an embodiment of the invention.
Figure 16:
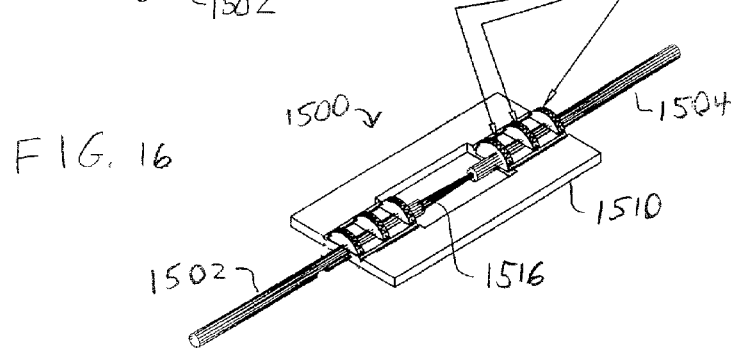
FIG. 16 is another pictorial view of the molded tapered fiber-to-fiber connector of FIG. 15.

FIGS. 15 and 16 show two different views of a molded tapered waveguide assembly 1500 made in accordance with another embodiment of the invention. Molded tapered waveguide assembly 1500 is similar to waveguide assembly 200 of FIG. 2, but waveguide assembly 1500 connects two optical fibers having different diameters and so the waveguide core is tapered. Molded tapered waveguide assembly 1500 can be used, for example, for conducting light between a large diameter multimode fiber 1502 and a smaller diameter single mode fiber 1504.

Because of the difference in fiber diameters, assembly 1500 uses a longer waveguide that gradually changes diameter. The fibers 1502 and 1504 are optically coupled through a molded waveguide 1516. Molded tapered waveguide 1500 includes a base plate 1510, reinforcement structures 1512 for providing mechanical strength to base plate 1510, and a molded tapered waveguide core 1516 for guiding the light between fiber 1502 and fiber 1504. A cladding material (not shown) can be molded over waveguide 1516 to improve its light carrying capability and to provide mechanical support and environmental protection to the molded tapered waveguide assembly 1500. A third material (not shown) can also be applied over the cladding material for additional support and protection.

Figure 17:
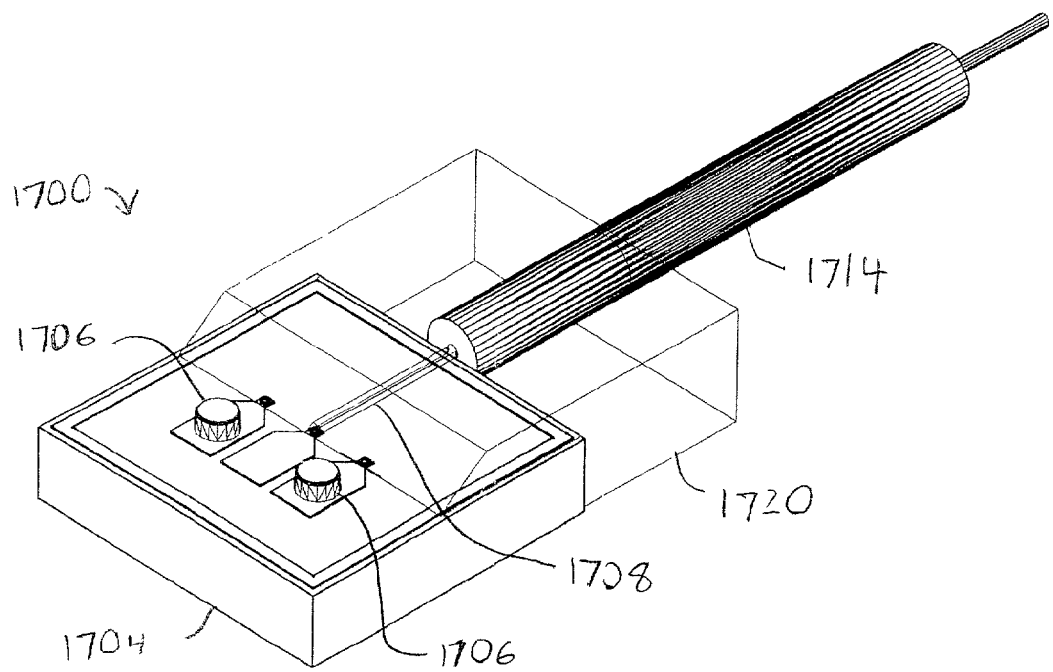
FIG. 17 shows a VCSEL assembly made in accordance with the present invention.

FIG. 17 shows a molded VCSEL assembly 1700 constructed in accordance with the present invention. VCSEL assembly 1700 includes a VCSEL element 1704 having gold bumps 1706 incorporated onto the electrical contacts of VCSEL element 1704 by its manufacturer. Bumping manufacturers, such as Chipbond Technology Corporation, Hsin-Chu, Taiwan, tightly control the size and position of the gold bumps, and the gold bumps can be used as a reference surface for aligning VCSEL element 1704 in a cavity plate during the fabrication process. In other embodiments, VCSEL element 1704 could include precision surfaces for alignment in the cavity plate. A waveguide 1708 is molded over the emission point of the laser. The waveguide core includes a 45 degree angle above the laser cavity to reflect the light ninety degrees and guides it to a fiber 1214. Waveguide core material 1708 may include a thin film, such as a thin metal coating, to reflect the light. Cladding material 1720 surrounds waveguide core 1708 and the end portion of fiber 1714, thereby forming a single unit of fiber 1714, waveguide core 1708, and VCSEL element 1704, with the optical elements aligned to transmit light with minimum loss.

VCSEL assembly 1700 is fabricated in a mold similar to mold 600, with the exception of the cavity plate having a groove for positioning fiber 1714 and holes for positioning VCSEL element 1704 relative to fiber 1714. The cavity plate includes a groove for forming core 1708. Material is forced into the groove and is cured to form waveguide core 1708. Material can be forced into the groove using a blade, such as in a screening process, or using an upper plate such as those shown in FIGS. 13 and 14.

Figure 18:
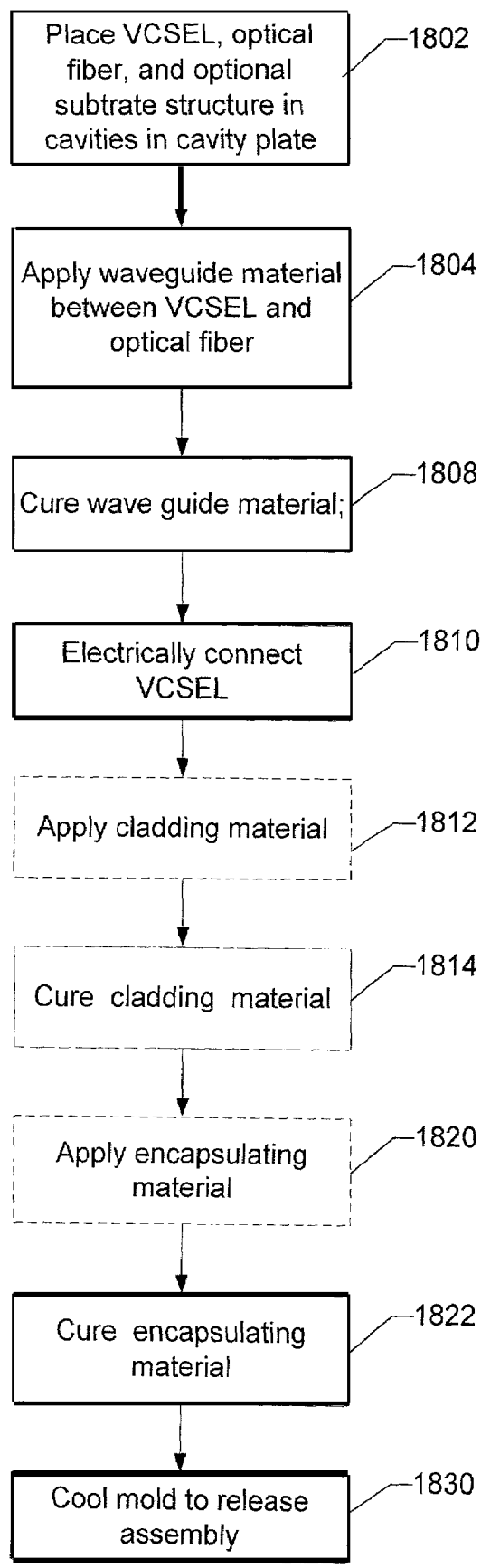
FIG. 18 is a flow chart showing the preferred steps for making the VCSEL assembly of FIG. 17.

FIG. 18 shows the preferred steps for fabrication a VCSEL assembly 1700. In step 1802, the VCSEL element 1704 and the fiber 1214 are placed in a cavity plate designed to align those elements. The cavity plate includes holes for receiving gold bumps 1706 and a groove for receiving fiber 1714. Alternatively, the cavity plate could include reference surfaces that mate with corresponding reference surfaces on a VCSEL element to precisely position the VCSEL element. The cavity plate includes a surface above the emission point of the VCSEL that is oriented at forty-five degrees to the top surface of the VCSEL element. The angled surface forms a reflecting surface in the waveguide to reflect light into optical fiber 1714. After molding, it may be necessary to apply a reflective coating to the waveguide above the VCSEL element to ensure sufficient reflectivity.

Optionally, VCSEL element can be positioned on a substrate such as a flexible printed circuit board (not shown.) The cavity plate includes cavities to receive the substrate and the substrate becomes part of the molded assembly. Other optical or electrical components can be mounted on the substrate and incorporated into the assembly.

In step 1804, waveguide core material is molded into position between VCSEL element 1704 and fiber 1714. The waveguide core material can be molded using a mold similar to that shown in FIGS. 6, 13, and 14. In step 1808, the waveguide material is cured to form waveguide 1708. The waveguide may be formed of the same material described with respect to the process shown in FIG. 12, and the processing parameters for molding and curing will be the same or similar.

In step 1810, electrical connections are made to the VCSEL. For example, if a flexible printed circuit board was included in the assembly, wires may be run from the flexible printed circuit to the VCSEL and be attached by wire bonding or by reflowing solder at the VCSEL connectors. The electrical connections can be made at any time before the terminals are covered. Electrical connections can be made to or between any components or substrates to carry electrical power or data to and from components.

In step 1812, a cladding material is molded onto the waveguide 1708 and optical fiber 1714, thereby binding them together and fixing the alignment between the VCSEL element 1702, optical fiber 1714, and waveguide 1708. The cladding material can be molded using a transfer molding, compression molding process, or other process. The cladding material is cured in step 1814. The cladding may be formed of the same material described with respect to FIG. 12, and the processing parameters for molding and curing will be the same or similar.

Optionally, a protective encapsulating material, such as an epoxy resin, is applied in step 1820 to cover the entire VCSEL assembly 1700. The encapsulating material is cured, if necessary, in step 1822. In step 1830, the mold may be cooled to assist in the release of the completed VCSEL assembly 1700.

The embodiments above show connections made to optical fibers. The connections could also be made to ferrules into which optical fibers can be placed, such as precision molded MT or ST ferrules or precision machines ceramic ferrules.

Connecting optical fibers to other fibers or to components is typically expensive because the fiber ends need to be cut at a precise angle, polished to reduce light scattering, and then actively aligned with the component so that the fiber cores line up with the light receiving portion of the connecting component. By molding a waveguide material that matches the index of refraction of the fiber core onto the end of the fiber, the need for polishing the fiber end is eliminated. The mold can be finished to produce a smooth surface on the waveguide so that polishing the molded waveguide is not required. The mold can also create the desired angle onto the end of the molded waveguide. Thus, the invention can be used inexpensively terminate fibers into a readily connected interface. By molding waveguides and connector shapes, the invention can also be used to create sets of assemblies and components that can be readily assembled and connected to each other in any desirable configuration without requiring active alignment or manual fiber terminations.

For example, a precision connector may be molded directly onto the end of an optical fiber. The connector can be formed so as to precisely mate with another optical component without active alignment. Alternatively, a fiber and a connector portion may be placed in a precision mold and a waveguide molded to connect the fiber to the connector portion to form a terminated fiber assembly that precisely mates with other components. Any combination of molded and preformed parts may be used, with the optical connection with the fiber being a molded waveguide.

Figure 19:
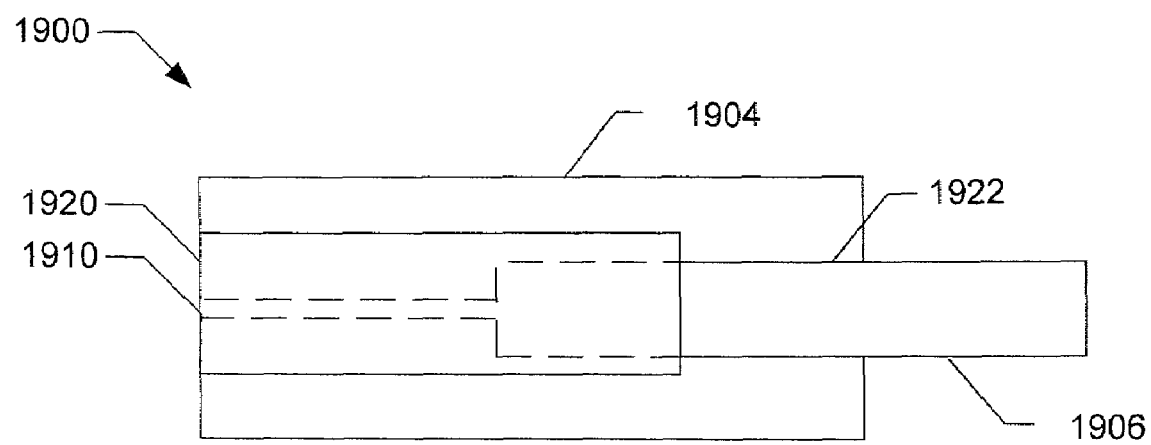
FIG. 19 shows a terminated fiber assembly made in accordance with the present invention.

FIG. 19 shows a terminated fiber assembly 1900 that is ready to be connected to another component. Terminated fiber assembly 1900 includes a support structure 1904, an optical fiber 1906, a waveguide material 1910, and a cladding material 1920. To fabricate terminated fiber assembly 1900, optical fiber 1906 is positioned and aligned within a groove 1922. Waveguide material 1910 and cladding material 1920 are molded. Cladding material 1920 partially embeds fiber 1906 maintaining it in position relative to a molded waveguide 1910. Support structure 1904 can comprise a substrate, such as a ceramic structure that is placed in the mold during fabrication of the assembly, or support structure 1904 can be a structure molded, for example, of the cladding material. The end of waveguide material 1910 takes on the desired surface finish and angle from the mold. The end of support structure 1904, waveguide 1910 and cladding 1920 are shaped so that the assembly can be plugged into other components, being aligned by one or more reference features on the assembly, such as on support structure 1904 or cladding 1920. Structures made in accordance with present invention can use any combination of preformed elements and molded elements, with at least one of the optical connections being molded.

As another example, the invention can be used to produce a frequency splitting assembly comprising multiple fibers, a grating, and filters, so that light coming into the grating is separated out into different frequencies for each of the connecting fibers. The fibers, filters, and grating can be molded together, along with the waveguides connecting the components. The grating component can be formed with reference surfaces to align with reference surfaces on another component, such as a laser, so that the frequency splitting component can be mixed and matched with various lasers without having to terminate and align each individual fiber.

The invention can be used in a wide variety of applications because the assemblies are rugged, inexpensive to manufacture, and optically efficient because the alignment is precise. It is particularly well suited for use in the following applications: High Bandwidth Parallel and/or WDM (Wave Divisional Multiplex) or DWDM (Dense WDM) Free Space, Fiber Links/Components, High Reliability Telco/Military Transceivers, High-speed digital processing, Micro-Optic Components, and sensors.

The embodiments described above are relatively simple examples of the assemblies that can be made in accordance with the invention. The invention is not limited to the creation of any particular assembly. Skilled persons will recognize that there is virtually no limit to the types and number of electrical and optical components that can be aligned and assembled in accordance with the invention.

The invention can be used to integrate a waveguide structure into a three dimensional structure of optical components. The present invention eliminates the need for active alignment of optical components, thereby greatly reducing cost. It can eliminate the requirement to polish the end of the connecting fiber because waveguide material is index matched to the fiber core material.

The specification above refers to primarily to "assemblies" that include a molded waveguide and a component. The invention can also include a molded waveguide without other components.

The invention has broad applicability and can provide many benefits as shown in the examples above. The embodiments will vary greatly depending upon the specific application, and not every embodiment will provide all of the benefits nor meet all of the objectives that are achievable by the invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A method of forming an assembly of optical components, comprising:
    providing a mold;
    positioning a first component in the mold;
    positioning a second component in the mold; and
    applying a formable material into the mold to form a waveguide for carrying light between the first and second components, the waveguide forming an optical path between the first component and the second component, at least one of the first or second components including a laser or other active optical component.

2. The method of claim 1 in which of the of the first or second components is an optical fiber or other passive optical component.

3. The method of claim 1 further comprising removing the first component, the second component, and the waveguide from a mold used to form the waveguide by providing a support structure to support the first component, the second component, and the waveguide as it is removed.

4. The method of claim 3 in which the support structure is adhered to the first component, the second component, and the waveguide.

5. The method of claim 4 in which the support structure is molded onto the first component, the second component, and the waveguide.

6. The method of claim 5 in which providing a support structure includes molding a cladding material to form the support structure.

7. The method of claim 4 in which the support structure includes a sticky surface and in which the support structure is adhered to the first component, the second component, and the waveguide by contacting to the sticky surface.

8. The method of claim 1 further comprising applying a second formable material into the mold to clad the waveguide material.

9. The method of claim 8 in which applying the second formable material includes applying the material to fix the first and second component together in alignment.

10. The method of claim 9 further comprising inserting a substrate element into the mold and in which applying the second formable material includes applying the second formable material to fix the first and second components onto the substrate.

11. The method of claim 8 in which applying the second formable material includes applying the material to form an enclosure or other protecting, supporting or subsequent aligning structure.

12. The method of claim 8 in which a third formable material is applied to form an enclosure or other protecting, supporting or subsequent aligning structure.

13. The method of claim 1 in which positioning the laser or other active optical component includes using bumps associated with electrical contacts on the component.

14. The method of claim 1 in which positioning the laser or other active optical component includes using bumps, pins, precision laser-drilled or micro-machined holes associated with electrical contacts on the component.

15. The method of claim 1 in which positioning the laser or other active optical component includes using precision location features provide by the component manufacturer.

16. The method of claim 1 in which positioning a first component in the mold includes positioning a single mode optical fiber in the mold.

17. A method of forming an assembly of optical components, comprising:
    positioning a first component in a mold;
    positioning a second component in the mold, such that positioning the first component in the mold or positioning the second component in the mold includes aligning an active optical element using an alignment structure;
    applying a formable material into the mold to form a light-carrying waveguide between the first and second components, the waveguide forming an optical path between the first component and the second component, the light carrying waveguide guide being sufficiently aligned with, the active optical element to eliminate the need for active alignment; and
    removing the first component, the second component, and the waveguide from a mold used to form the waveguide by providing a support structure to support the first component, the second component, and the waveguide as it is removed.

18. The method of claim 17 in which the light carrying waveguide guide is aligned with the active optical element to within 5 microns.

19. The method of claim 17 in which the light carrying waveguide guide is aligned with the active optical element to within 3 microns.

20. A method of making an optical assembly, comprising:
providing a precision mold having an alignment structure within the mold for aligning at least one active optical element and having a structure for forming a light-carrying waveguide to the at least one optical element;
positioning the at least one active optical component within the precision mold using the alignment structure;
filling the structure for molding a light-carrying waveguide to the at least one optical element with a waveguide forming material; and
removing the precision at least one optical element and the light-carrying waveguide from the precision mold, the alignment structure providing sufficiently accurate alignment to eliminate the requirement for active alignment.

21. The method of claim 20 in which filing the structure for molding a light-carrying waveguide includes injecting a wave guide forming material under pressure.

22. The method of claim 20 in which filing the structure for molding a light-carrying waveguide includes screening or stenciling a wave guide forming material onto a mold plate.

23. The method of claim 20 in which removing the at least one optical element and the light-carrying waveguide from the precision mold includes removing the at least one optical element and the light-carrying waveguide adhered to a support structure.

24. The method of claim 23 in which the support structure is molded over the at least one optical element and the light-carrying waveguide.

* * * * *